Feb. 25, 1930.     A. J. BENTLEY     1,748,101
APPARATUS FOR USE IN THE MANUFACTURE OF ICE
Original Filed May 29, 1924
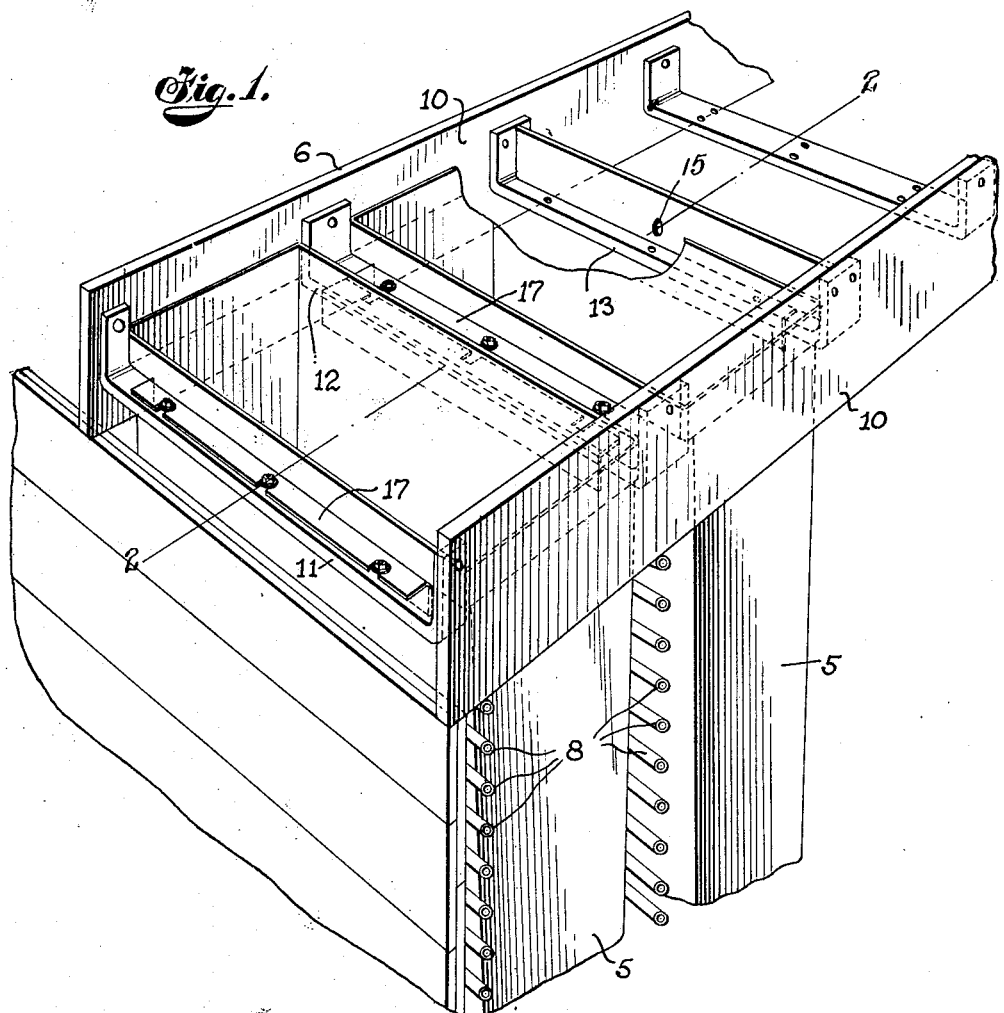
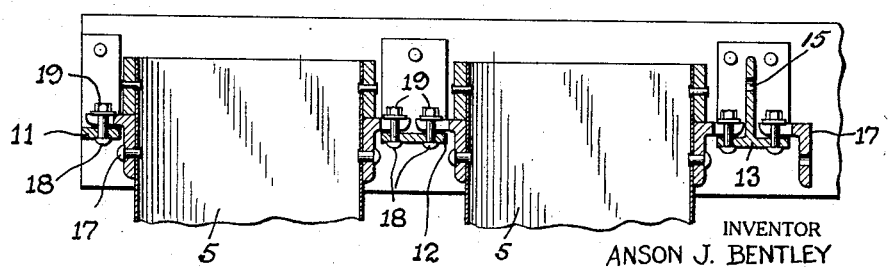
INVENTOR
ANSON J. BENTLEY
BY
ATTORNEYS Patented Feb. 25, 1930

1,748,101

UNITED STATES PATENT OFFICE

ANSON J. BENTLEY, OF NILES, OHIO

APPARATUS FOR USE IN THE MANUFACTURE OF ICE

Application filed May 29, 1924, Serial No. 716,540. Renewed March 9, 1928.

The present invention relates to apparatus for use in the manufacture of ice and has for an object to provide improved arrangements whereby the freezing cans can be handled expeditiously in harvesting the ice and in introducing into the freezing bath cans of fresh water to be frozen.

According to the prevailing practice in ice making plants of the type with which the invention is more particularly concerned, freezing cans filled with fresh water are immersed in a freezing brine until the complete ice cake is formed whereupon they are removed from the brine, dipped in warm water to loosen the ice, inverted to discharge the ice cake, and then returned to the brine and refilled.

The present invention, in its preferred form, makes improved provision for expeditiously lifting a number of freezing cans at one time in such manner that a group of cans, as a unit can be removed from the brine tank, transported, dipped in warm water to free the ice and inverted to discharge the ice cakes, the cans being relatively rigidly connected to each other so that manipulation of individual cans as distinguished from manipulation of the group unit is unnceessary.

The number of cans which may be advantageously connected in one unit vary with local conditions. If an unduly large number of cans are handled together the consequent introduction of so many cans of fresh and relatively warm water into the tank at one time may raise the temperature of the brine to such an extent as to decrease the efficiency of all the brine effected, whereas if the cans are changed a few at a time, the temperature of the brine is not effected to so great an extent and better efficiency is maintained. I find it convenient and conducive to expeditious handling of the cans and to economical operation of the plant to arrange the apparatus so that from twelve to twenty-four cans can be handled as a unit, the exact number depending upon the size of the brine tank and other local conditions.

The invention is susceptible of embodiment in a variety of mechanical structures, one of which for the purpose of illustration will be particularly described herein but it is to be understood that this description is given for the purpose of illustration only and is not to be construed as defining the limits of the invention.

Referring to the drawings:

Figure 1 is a perspective view of an end portion of the carrier-frame constructed in accordance with the principles of the invention, with freezing cans supported therein showing the position of the same with relation to the freezing tank.

Figure 2 is a detailed sectional view taken on the line 2—2 of Figure 1.

Referring more particularly to the apparatus shown in the drawing, a number of freezing cans 5 are so connected that they can be handled as a unit during the operations incident to the freezing and harvesting of the ice. The connecting means shown consists of a carrier-frame 6 in which cans 5 of any suitable design, such for example as cans of the type shown in the patent to Bentley No. 1,437,165 dated November 28, 1922 can be removably or permanently secured. In the particular structure shown, they are retained positively but removably.

By this arrangement, all cans are firmly secured in the carrier-frame during manipulation thereof, but an individual can may be removed and replaced as occasion may require.

The construction of the carrier-frame may vary in accordance with the requirements of the freezing tank or of the particular cans in use. The apparatus shown is designed for use in a freezing tank having freezing coils between the successive cans as indicated at 8. The carrier frame properly spaces the cans and is so constructed that it will clear these coils when it, with the supported cans is lowered into place in the freezing tank.

As shown the carrier-frame comprises side bars 10, 10 and cross bars 11, 12, 13. The cross bars may be of any suitable form. As shown, certain of the cross bars consist merely of a strip of bar metal bent upwardly at their ends and riveted securely to the side members. Certain other cross bars are arranged for the attachment of lifting devices for removing the carrier-frame and cans from the freezing tank. One of these supporting cross bars is indicated at 13 and consists of a bar T-shaped in cross section, the web of which is apertured at 15 to receive a lifting hook or the like. It is desirable that the series of freezing pipes 8 extend as near as possible to the tops of the freezing cans and therefore the carrier-frame and especially the side members thereof should be so designed as to interfere as little as possible with this arrangement. In the construction shown, the cross bars on which the cans are supported are so positioned relative to the side members that the latter will extend substantially above the tops of the freezing cans. By this arrangement the side members may be made of sufficient depth to provide the required strength and rigidity without its being necessary to make the same of undue thickness laterally. The side bars may rest upon any suitable supports provided therefor. Any suitable means may be provided for securing the cans to the carrier-frame. As shown, each can is provided with an angle iron 17 secured to each side thereof in such position that a horizontal flange extends over the cross bar. Each angle iron is secured to the cross bar on which it rests as by means of bolts 18 and nuts 19 as indicated in Figure 2.

The described arrangement permits the number of cans handled as a unit to be dipped in a thawing tank, dumped by inverting and filled with water at a suitable filling station where arrangements can be made for expeditiously filling all cans simultaneously in a minimum of time.

The provision whereby the individual cans are held positively and rigidly in position in the carrier-frame insures a rigid unitary operative structure and prevents dislocation of a can during dumping, while permitting convenient removal of a can for replacement or repair.

Variation in the structure and arrangement may be made as occasion requires without departing from the scope of the invention.

Claims:

1. In apparatus for use in the manufacture of ice, a structure constructed and arranged to be handled as a unit comprising, in combination, a plurality of freezing cans and a carrier frame comprising side and cross members contacting with said cans adjacent their upper edges only, the cans having outstanding flanges engaging certain of said members to provide support for the cans while leaving unobstructed spaces between said cans from the bottoms thereof substantially to the tops, and means for detachably fastening the flanges to said members.

2. In apparatus for use in the manufacture of ice, a structure constructed and arranged to be handled as a unit, comprising in combination, a plurality of freezing cans and a carrier frame adapted to engage the cans adjacent their top edges only, the said carrier frame comprising connected longitudinal and transverse members surrounding the cans and leaving the spaces between the cans unobstructed except adjacent their top edges and the cans having outstanding flanges engaging the cross members to provide support for the cans and means for detachably securing the flanges to the cross members.

3. In apparatus for use in making ice, a structure constructed and arranged to be handled as a unit comprising a shallow carrier-frame and a plurality of freezing cans removably carried thereby and engaging the frame at their top portions only, the carrier-frame comprising parallel side members and cross members connecting the side members, the cans having outstanding flanges engaging the cross members to provide support for the cans, and means for clamping the flanges to the cross members, the relative arrangement of the side members and cross bars and of the flanges on the cans being such that the side members extend above the tops of the cans and the spaces between the cans are left free and open whereby the cans can be lowered into a brine tank with freezing coils positioned between the cans.

4. In apparatus for use in making ice, a structure constructed and arranged to be handled as a unit comprising a carrier-frame and a plurality of freezing cans removably carried thereby, the carrier frame comprising narrow side members having their upper edges extending above the tops of the cans and cross members connecting the side members, the tops of the cross members lying in a plane substantially below the tops of the cans and the cans having flanges engaging the side members to support the cans and bolts for securing the flanges to the cross members.

5. In ice making apparatus, a refrigerating tank having spaced vertical series of refrigerating pipes, a plurality of freezing cans between said series of pipes and spaced thereby, a carrier frame supporting said freezing cans in such spaced relation, said carrier frame comprising side members having their upper edges extending above the tops of the cans and cross members connecting the side members and providing support for the cans at points spaced from the tops of the cans, the freezing cans having outwardly directed flanges engaging the cross members and bolted thereto.

6. In an apparatus for use in the manufacture of ice, a structure adapted to support a plurality of freezing cans so that they may be handled as a unit, comprising longitudinal members and cross members forming unit can spaces to receive the upper edges of the cans while leaving unobstructed spaces between said cans from the bottoms thereof substantially to the top, and means secured to the cans and adapted to support the cans on said members.

7. In apparatus for use in the manufacture of ice, a frame and a plurality of freezing cans supported thereby for handling as a unit, the cans being supported near their top edges upon the frame near its lower edge whereby the full supporting strength of a relatively deep frame may be realized with the maximum exposure of the cans therebelow, the cans extending clear of each other below the frame, all for the purposes described.

8. Apparatus as set forth in claim 7 which further includes means for rigidly and detachably securing the cans in said frame.

9. In apparatus for use in the manufacture of ice, a frame and a plurality of freezing cans supported thereby for handling as a unit, the cans being supported near their top edges below the top edge of the frame whereby the full supporting strength of a relatively deep frame may be realized with the maximum exposure of the cans therebelow, the cans extending clear of each other below the frame, all for the purposes described.

10. In apparatus for use in the manufacture of ice, a frame and a plurality of freezing cans rigidly and detachably secured thereto, said frame including relatively deep longitudinal members and connecting cross members secured to the longitudinal members, said cans including support members resting on said frame members with the tops of the cans positioned below the top of said and means for rigidly and detachably securing the cans in said frame.

11. In apparatus for use in the manufacture of ice, a frame comprising cross members and relatively deep longitudinal members, said members providing relatively thin ledges below the top surface of the frame, a plurality of cans supported by said frame, said cans having laterally projecting support ledges near the top edges thereof adapted to rest on said frame ledges, and means cooperating with said ledges for rigidly securing said cans to said frame.

12. Apparatus as set forth in claim 11 which is further distinguished by the fact that the means securing the cans to the frame permits them to be quickly detached therefrom.

13. In apparatus for use in the manufacture of ice, in combination, a frame providing support for a plurality of freezing cans and means for rigidly and detachably securing the cans in said frame.

14. In apparatus for use in the manufacture of ice, in combination, a frame providing support for a plurality of freezing cans, said frame including longitudinal bars and cross bars, and means for rigidly and detachably securing the cans in said frame.

15. In apparatus for use in the manufacture of ice, in combination, a frame providing support for a plurality of freezing cans, said frame including longitudinal bars and cross bars together forming a complete enclosure for each can, and means for rigidly and detachably securing the cans in said frame.

In testimony whereof, I have signed my name to this specification this 26th day of May, 1924.

ANSON J. BENTLEY.

CERTIFICATE OF CORRECTION.

Patent No. 1,748,101. Granted February 25, 1930, to

ANSON J. BENTLEY.

It is hereby certified that error appears in the printed specification of the above numbered patent requiring correction as follows: Page 3, line 36, claim 10, after the word "said" insert the word "frame", and in line 38, for the word "in" read "to"; and that the said Letters Patent should be read with these corrections therein that the same may conform to the record of the case in the Patent Office.

Signed and sealed this 25th day of March, A. D. 1930.

(Seal)

M. J. Moore,
Acting Commissioner of Patents.